United States Patent Office 3,835,040
Patented Sept. 10, 1974

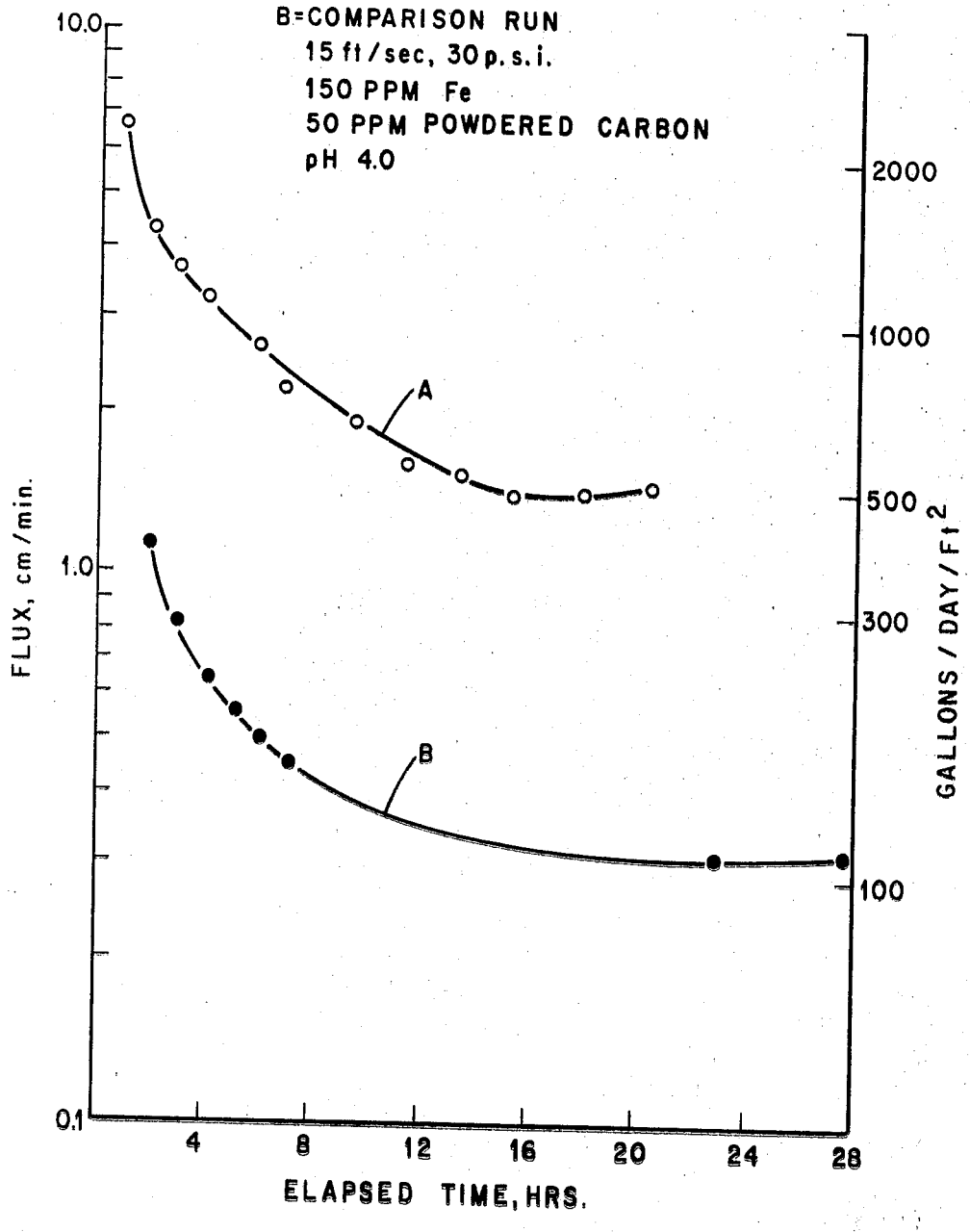

3,835,040
CROSS-FLOW FILTRATION PROCESS
Harvey A. Mahlman, Knoxville, and Warren G. Sisson, Oak Ridge, Tenn., assignors to the United States of America as represented by the United States Atomic Energy Commission
Filed Apr. 4, 1973, Ser. No. 347,755
Int. Cl. C02c 5/06
U.S. Cl. 210—23                                    5 Claims

ABSTRACT OF THE DISCLOSURE

A process is provided for removing the organic and phosphate content of an aqueous feed containing same which comprises adding an effective amount of at least one additive selected from the group consisting essentially of a salt which hydrolyzes to a hydrous oxide, adjusting the pH of said feed to a value below 3.5, digesting said feed in air at a temperature in the range 32° to 100° F., increasing the pH of the digested feed to a value in the range 5.5 to 7.5, and then filtering the digested feed.

BACKGROUND OF THE INVENTION

The invention described herein was made in the course of, or under, a contract with the U.S. Atomic Energy Commission.

The present invention relates to a pollution control process for the clarification of aqueous sewage effluents. More particularly, it relates to an improved cross-flow filtration process for the removal of phosphate and iron content of aqueous sewage effluents as typified by primary and secondary sewage. The improved process of this invention produces a water product which satisfies the requirements of pollution control standards, allowing it to be released to public streams.

My cross-flow filtration we mean a separation process in which a solution or suspension is flowed tangentially past one face of a porous substrate to generate a clarified filtrate (water product) at the opposite side of said substrate. The improved process of this invention achieves effective results by treating either primary sewage effluent or secondary sewage effluent where primary sewage efflent means the liquid phase resulting from sedimentation of a previously untreated raw sewage feed and secondary sewage means the product resulting from treating primary sewage effluent by either further sedimentation, biological processes, or other means to reduce the amount of suspended solids. In either case, the liquid phase effluent contains biologically harmful amounts of phosphates, iron, and organic compounds. These materials are deemed biologically harmful because they are excellent plant nutrients which when present in large amounts overstimulate plant growth and in turn reduce the amount of oxygen in the water available for aquatic life, thus leading to severe upsets in the ecological balance.

SUMMARY OF THE INVENTION

It is therefore an object of this invention to improve the efficiency of cross-flow filtration of aqueous sewage effluents to produce a water product which contains reduced amounts of plant nutrient.

The present invention is an improvement in the process disclosed in U.S. Pat. No. 3,733,265, of common assignee, for removing the organic and phosphate content of an aqueous feed which comprises mixing with said feed finely divided carbon or graphite and an effective amount of at least one additive selected from the group consisting essentially of a salt which hydrolyzes to a hydrous oxide, or the hydrous oxide itself, adjusting the pH of said feed to a value no greater than 4, and then passing the thus-mixed feed tangentially past one face of a porous substrate at a pressure of from 3 to 100 p.s.i. sufficient to produce a clarified filtrate on an opposite face of said substrate. The process of U.S. Patent 3,733,265 has been found effective to remove phosphate and iron levels to a remarkably low level at satisfactory fluxes. The present invention allows a still further reduction in phosphate, iron, and carbon content and at the same time results in improved flux. nI the present invention the pH of primary or secondary sewage effluents is acidified to a pH of at least 3.5, the mixture agitated mechanically or by air sparging at a temperature in the range 32° to 100° F. for a period of 15 minutes or longer. A predigested feed resulting from this procedure can be processed by the method of the above cited copending application to much lower levels of phosphate and iron in comparison with undigested feed. Moreover, the digestion operation results in product fluxes which are much higher than undigested sewage effluents.

There are various modes of conducting cross-flow filtration which can be used to practice the process of this invention, all of which involve fairly simple arrangement. In one case, termed an internal flow-through unit, a length of porous support is securely fastened between two pieces of pipe. The fed solution is pumped through the porous support and filtration occurs from the inside outwards. A second variation, termed external flow-through, involves passing feed through an annulus defined between a porous support (or arrays of such supports) and an outer jacket made of plastic or steel, for example, where the filter may consist of a length of fire hose jacketing wrapped around a porous or perforated supporting steel or other porous metal or plastic tubing. This arrangement allows backflushing by passing pressurized water, air, or other gas through the support tube to dislodge accumulated sludge on the surface of the filter material. Still a third unit is a modification of the external flow arrangement to allow the use of a fluidized bed to operate in the annulus. Here, the annular space between the porous support and the jacket contains fluidizing particles, such as stainless steel particles. The unit is operated essentially vertically and the velocity of the feed flowing upwardly through the annulus is controlled to fluidize the stainless steel particles and maintain sufficient turbulent action to keep the filter free of excessive cake buildup.

In a typical procedure, an appropriate amount of metal salt is mixed with a given volume of primary sewage effluent whereupon the mixture is pumped through a filter test unit of the internal or external flow-through type at a pressure and velocity sufficient to effect cross-flow filtration. Typical pressures used were in the range 3 to 100 p.s.i. and cross-flow velocity in the range 2 to 30 ft./sec.

The filtering medium useful in conducting a cross-flow filtration process in accordance with this invention comprises a porous substrate material having pores of from 5 to as much as 2000 microns in size, aided, in cases where needed to modify pore size, by an inert filter aid material deposited on the feed side of the substrate material. The substrate material may comprise flexible, pressure-resistant fire hose jacket, for example, made from polyester warp with nylon filler; stainless steel or other metal screening; nylon, polyester, or other synthetic screens; and porous ceramic or carbon. The filter aid may be selected from such material as diatomaceous earth, perlite, asbestos fiber, cellulose fiber, silica gel, and carbon fiber or powder. Neither particle shape nor size is critical so long as the filter aid serves to control pore size. The filter aid particles may be deposited as a thin bed on the substrate by passing a slurry of the particles over the substrate in a pretreatment step or may be incorporated in the feed to be filtered. The depth of the deposited filter aid material may range from one to several thousand microns.

An inorganic salt of a metal which forms an anion exchange active hydrous metal oxide may be used to realize the objects and advantages of this invention. As a practical matter, the preferred salts are selected from those which are cheap and readily available. Salts of iron and aluminum in the +3 oxidation state are the preferred from this standpoint. Of the many ferric salts which are useful in this context we have tried $FeCl_3$, ferric ammonium sulfate, and ferric sulfate as additives to aqueous sewage effluents and have found them to be eminently effective in maintaining a usefully high flux while rejecting a high percentage of total organic carbon content as well as phosphates. Of the available aluminum salts, aluminum sulfate can be used with advantage to remove organic carbon and maintain a usefully high product flux. Other salts which hydrolyze to form a hydrous oxide are within the scope of this invention but are not preferred because of economic considerations. Thus, by way of example, the salts of zirconium, titanium, tin, and rare earths such as cerium and lanthanum hydrolyze to form hydrous metal oxides but are less readily available or more expensive than the salts of iron or aluminum.

The improvement of the present invention is realized by reducing the pH of the primary or secondary aqueous effluent by addition of enough of the hydrolyzable salt such as the sulfate or chloride salts of iron, or by the addition of an acid such as sulfuric or hydrochloric acid, or by a combination of hydrolyzable salt and acid to reduce the pH to a value of 3.5 or less. After a period of digestion in air ranging from 15 minutes to 16 hours at a temperature in the range 32° to 100° F., the pH is raised to a value in the range 5.5 to 7.5 by addition of alkaline metal or alkaline earth hydroxides. The filtration temperature of the sewage effluent—hydrous metal oxide mixture is not critical, although higher filtration rates are observed at the higher temperature. A comparison of the effectiveness of the improved process of this invention to that disclosed in U.S. Pat. 3,733,265 is shown in Table I, below.

TABLE I.—COMPARISON OF SUBJECT INVENTION WITH PRIOR PROCESS FOR PURIFICATION OF SEWAGE WASTES

|  | Current process | Previous process |
|---|---|---|
| Flux (g.p.d.) | 1,000–1,500 | 150 |
| $PO_4$ (p.p.m.)[1] | <0.01 | 0.4 |
| Turbidity (JTU)[2] | 0.1–0.4 | 0.3–0.8 |
| Fe introduced (p.p.m.) | 25–100 | 100 |
| Fe in product (p.p.m.) | 0.001 | 1.0 |

[1] Original $PO_4$ content was 30–50 p.p.m.
[2] Original turbidity was 20–60 Jackson turbidity units.

These results show that the process produces a product much reduced in phosphate, iron, and turbidity.

A further comparison of the subject invention and the prior technique is shown in the figure. As shown in curve A, use of the technique of the subject invention, i.e., digestion at a pH of 3.0 for one hour followed by a pH adjustment to 6.0, results in a much faster rate of filtration. While the condition of the fire hose jackets in both cases is initially the same, it can be seen that a considerable flux decline occurs in the prior method. In the subject development, 93 percent water recovery is obtained, while only 57 percent of the water is recovered in the prior technique for the same times of filtration.

While we cannot positively explain the improved results, it is postulated that acidolysis of the organic compounds caused by the lowered pH results in the improved flux.

It is though that negatively charged materials in sewage are particularly prone to cause flow-resistant interfacial layers and that these materials are tied up by the hydrous metal oxide acting as an anion exchanger. The presence of iron(II) in the solution at low pH suggests that iron(III) has been reduced with a commensurate oxidation of organic compounds in the effluent. The organic compounds thus oxidized might be of either a lower molecular weight or in a form which can be easily exchanged with hydrous iron oxide. The exchanged molecules are more easily filtered and are not available per se to form flux reducing dynamic membranes or filter cake deposits.

It may be seen that we have provided an improved process for reducing the amount of plant nutrient content of aqueous feeds such as primary and secondary sewage effluents. The degree of iron and phosphate removal is reduced to such low levels that the aqueous product can be safely discharged to public streams without upsetting the ecological balance adversely. Moreover, these results are obtained at high product fluxes which make the process amenable for treating relatively large volumes of feed.

What is claimed is:

1. An improved method for treating aqueous sewage which comprises the sequential steps of adding an effective amount of at least one additive selected from the group consisting essentially of a salt which hydrolyzes to a hyhydrous oxide, or the hydrous oxide itself, adjusting and maintaining the pH of said feed to a value below 3.5, digesting said feed in air at a temperature in the range 32° F. to 100° F. for a period of at least 15 minutes, increasing the pH of the digested feed to a value in the range 5.5 to 7.5, and then passing the pH-adjusted digested feed tangentially past one face of a porous substrate at a pressure of from 3 to 100 p.s.i. sufficient to produce a clarified filtrate on an opposite face of said substrate.

2. The process according to claim 1 in which the pH of the digested feed is adjusted to a value in the range 5.5 to 7.5 by addition of an alkali or alkaline earth to said feed.

3. The process according to claim 1 in which the additive is ferric sulfate.

4. The process according to claim 1 in which the additive is aluminum sulfate.

5. The process according to claim 1 in which the acid pH of the feed prior to digestion is obtained by addition of the selected hydrolyzable salt, by the addition of acid, or by a combination of said hydrolyzable salt and acid.

References Cited

UNITED STATES PATENTS

| 3,733,265 | 5/1973 | Kraus et al. | 210—23 |
| 3,694,356 | 9/1972 | Johannes | 210—47 |
| 3,480,144 | 11/1969 | Barth et al. | 210—18 |

OTHER REFERENCES

Culp et al., "Advanced Wastewater Treatment," Van Nostrand Reinhold Company, New York, 1971, pp. 29, 30.

Parsons, W. A., "Chemical Treatment of Sewage and Industrial Wastes," National Lime Association, Washington, D.C., pp. 48, 49.

THOMAS G. WYSE, Primary Examiner

B. CASTEL, Assistant Examiner

U.S. Cl. X.R.

210—51, 75